United States Patent [19]

Sasaki et al.

[11] Patent Number: 4,920,553
[45] Date of Patent: Apr. 24, 1990

[54] FILM FEEDER OF A CASSETTELESS X-RAY PHOTOGRAPHIC APPARATUS

[75] Inventors: Shigeru Sasaki; Hisashi Sakakihara, both of Ootawara, Japan

[73] Assignee: Tokyo Shibaura Denki Kabushiki Kaisha, Kawasaki, Japan

[21] Appl. No.: 205,035

[22] Filed: Jun. 2, 1988

Related U.S. Application Data

[63] Continuation of Ser. No. 27,130, Mar. 16, 1987, abandoned, which is a continuation of Ser. No. 583,228, Feb. 24, 1984, abandoned.

[30] Foreign Application Priority Data

Feb. 26, 1983 [JP] Japan .................. 58-31590

[51] Int. Cl.$^5$ ............................................. G03B 42/04
[52] U.S. Cl. ......................................... 378/173; 378/172
[58] Field of Search ................. 378/172, 173, 204; 258/327.2 J

[56] References Cited

U.S. PATENT DOCUMENTS

| | | | |
|---|---|---|---|
| 3,582,062 | 6/1971 | Andrus | 271/5 |
| 3,684,276 | 8/1972 | Bridgeman | 271/20 |
| 3,879,031 | 4/1975 | Melehan | 271/11 |
| 4,160,912 | 7/1979 | Hogan | 378/173 |
| 4,495,634 | 1/1985 | Suzuki | 378/173 |

FOREIGN PATENT DOCUMENTS 1182951 10/1962 Fed. Rep. of Germany .
0005730 1/1983 Japan ..................... 378/204
2071622 9/1987 United Kingdom .

OTHER PUBLICATIONS

Japanese Utility Model Publication (Kokoku), No. 29106, 7-1978.
Patent Abstracts of Japan, vol. 7, No. 75, Mar. 29, 1983, and JP—A—58—5731.
Patent Abstracts of Japan, vol. 6, No. 166, Aug. 31, 1982, and JP—A—57—82827.

Primary Examiner—Carolyn E. Fields
Assistant Examiner—David P. Porta
Attorney, Agent, or Firm—Finnegan, Henderson, Farabow, Garrett and Dunner

[57] ABSTRACT

A film feeder of a cassettes X-ray photographic apparatus comprises a plurality of suction cups capable of attracting unexposed film in a first and second magazines receiving unexposed film of different sizes, first guide path for guiding the cups between the first magazine and a feed mechanism which feeds unexposed film to a holder section, a second guide path for guiding the cups between the second magazine and feed mechanism, and a drive control mechanism for moving the cups attracting unexposed film from the first and second magazine to the holder along the first and second guide path selected optionally. The cups are moved in a vertical, slant and horizontal direction by the drive control mechanism.

10 Claims, 5 Drawing Sheets

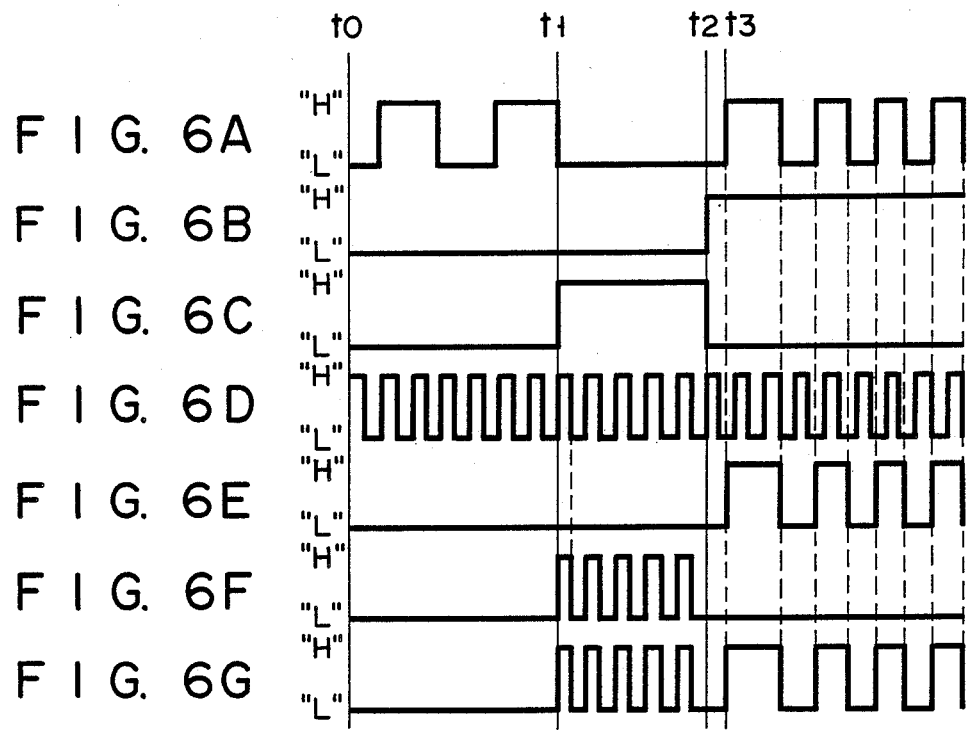

FILM FEEDER OF A CASSETTELESS X-RAY PHOTOGRAPHIC APPARATUS

This application is a continuation of application Ser. No. 027,130, filed Mar. 16, 1987, which is a continuation of application Ser. No. 583,228, filed Feb. 24, 1984 both abandoned.

BACKGROUND OF THE INVENTION

The present invention relates to a film feeder of a cassette-less X-ray photographic apparatus, in which unexposed film is taken out from a magazine by a suction means such as suction cups and is fed to a holder for X-ray photographing.

FIG. 1 shows an example of an apparatus of this type. In FIG. 1, a spot-shot section 2 for X-ray photographing using transmitted X-ray from an X-ray generator 1 is disposed under a bed 3. First and second film supply magazines 4 and 5 which store a plurality of unexposed film of different sizes are removably attached to the spot-shot section 2. Also, a film recovery magazine 6 which stores exposed film is removably disposed under the first and second magazines 4 and 5.

FIG. 2 shows the construction of the spot-shot section 2 in detail. Unexposed fim is taken out from the first film supply magazine 4 by suction, and is fed from one spot P1 to another spot P3, as shown in FIG. 2. In order to prevent the removal of superposed film, a first suction cup 7 is provided which oscillates in the directions indicated by an arrow A1 in the course of feeding. Likewise, unexposed film is taken out from the second film magazine 5 by suction, and is fed from a spot P4 to a spot P6. A second suction cup 8 which oscillates in the directions indicated by an arrow A2 in the course of feeding is provided for the prevention of the removal of superposed films. Unexposed film fed by the suction cups 7 and 8 is delivered to a transfer path 9 which is formed of a number of conveyor rollers 9a and conveyor guides 9b, and is fed into a fastening plate 11 by a pair of feed rollers 10a and 10b which face each other. Thereafter, the fastening plate 11 is transferred to a shooting position for X-ray photography which is done by operating control console (not shown). Exposed film is drawn out from the fastening plate 11 as the feed rollers 10a and 10b are rotated reversely. Then, the exposed film is reversely transferred along the transfer path 9 and carried into the film recovery magazine 6 via a diverging portion 9c.

The prior art apparatus, however, requires the number of suction cups to be equal to the film supply magazines. A number of drive mechanisms are needed to linearly move and rock the suction cups, making the apparatus bulky and complicated in structure. Since the transfer path for guiding film along the conveyor guides is relatively long, film may be damaged during feeding. If the film is jammed, moreover, it cannot easily be removed. Since part of the transfer path serves both as a forward and return path, one operation cycle for continuous photographing requires much time.

SUMMARY OF THE INVENTION

The object of the present invention is to provide a film feeder of a cassetteless X-ray photographic apparatus, affording a reduced drive mechanism for suction means such as suction cups which simplifies the construction, which shortens the shot cycles, which is easy to maintain, and which improves the reliability of film feeding.

BRIEF DESCRIPTION OF THE DRAWINGS

FIGS. 6A to 6G are time charts for illustrating the operation of the synchronous control means.

DETAILED DESCRIPTION OF THE PREFERRED EMBODIMENT

Figure 1:
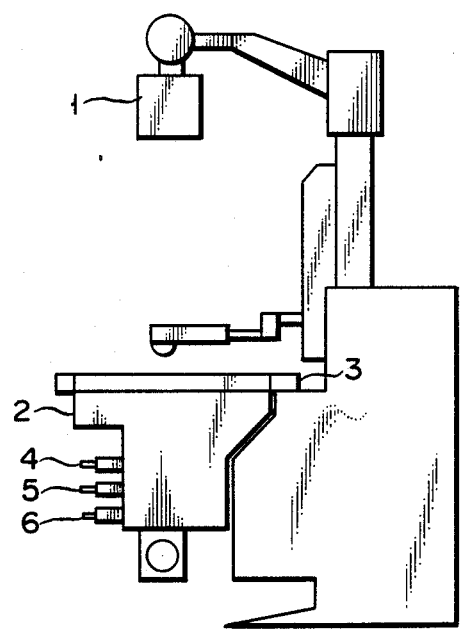
FIG. 1 is a side view schematically showing a conventional cassetteless X-ray photographic apparatus.
Figure 2:
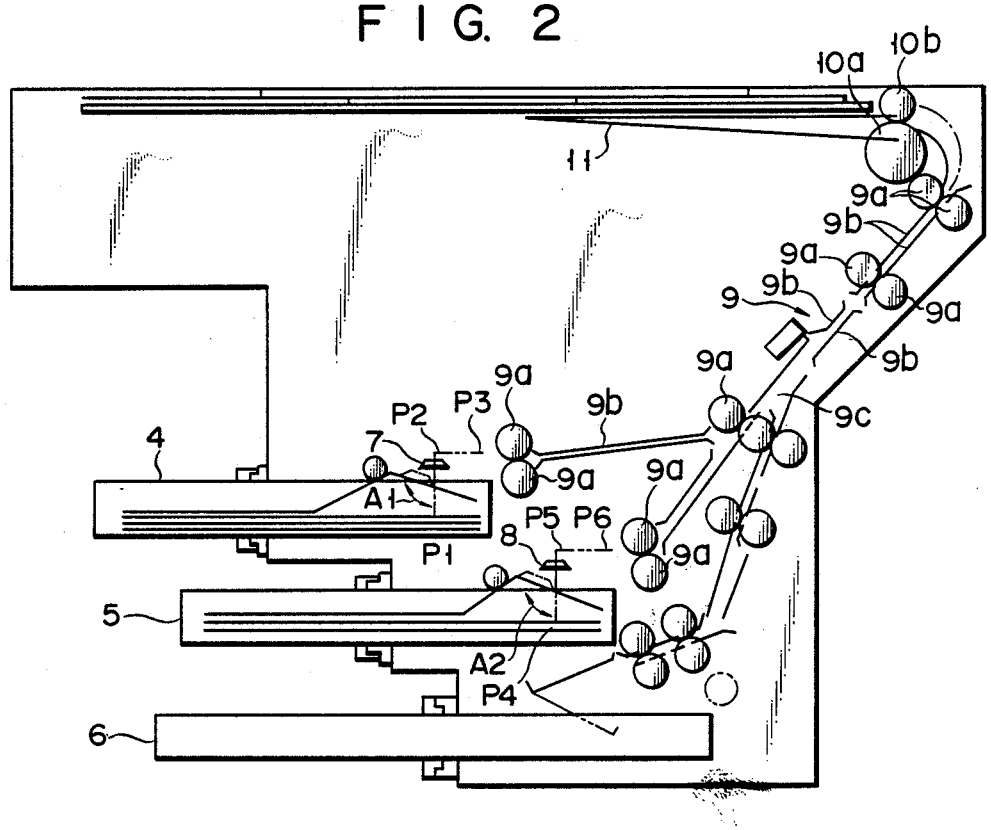
FIG. 2 shows an outline of a prior art film feeder.

A photographic film feeder of a cassetteless X-ray photographic apparatus according to one embodiment of the present invention will now be described with reference to the accompanying drawings.

Since the X-ray photographic apparatus has the same outline as the conventional one, only a spot-shot section including the photographic film feeder, which constitutes a special feature of the invention, will be described with reference to the drawing in FIG. 3.

Figure 3:
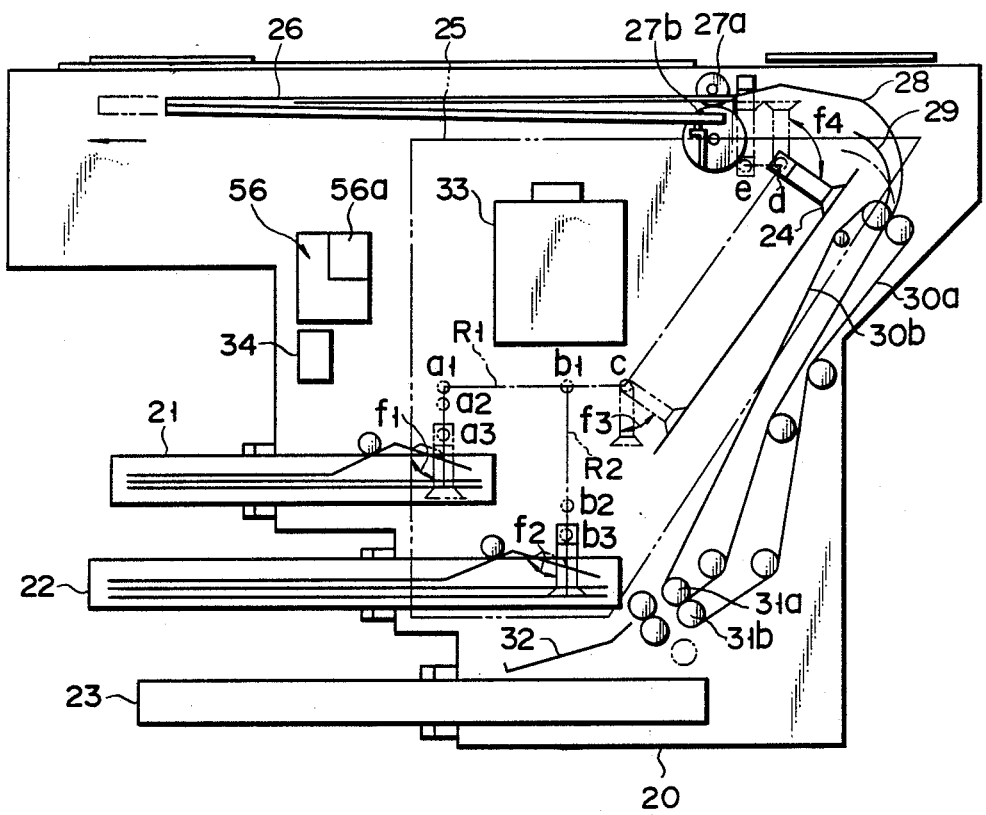
FIG. 3 shows an outline of a film feeder according to one embodiment of the present invention.

In FIG. 3, numeral 20 designates a frame. A first film supply magazine 21, a second film supply magazine 22, and a film recovery magazine 23 are detachably inserted, by a conventional method, in individual openings that are vertically arranged on one side of the frame 20. A bundle of unexposed film of one size and bundle of unexposed film of the different size are stored individually in the first and second magazines 21 and 22. The recovery magazine 23 stores therein film that is exposed in the manner mentioned later. A movable suction means 24 and a drive mechanism 25 for moving the suction means 24 are arranged in the frame 20.

A film holder or fastening plate 26 for holding unexposed film for X-ray photography is disposed inside the upper portion of the frame 20 for horizontal reciprocation. The film holder 26 is formed of a pair of flat plates that are combined so that one end of each plate is pivotally supported for swinging the other end side. A feed mechanism 27 is provided near the other end of the film holder 26 when the holder 26 is located in its right-hand motion limit position. The feed mechanism 27 is formed of a pair of reversible feed rollers 27a and 27b that can be separated from each other. The feed mechanism 27 supplies the film holder 26 with unexposed film fed from the film supply magazine 21 or 22 by the suction means 24, and also feeds exposed film from the film holder 26 to the return-feed mechanism mentioned below.

The return-feed mechanism, which is provided near the feed mechanism 27, includes a fixed guide plate 28 and a movable guide plate 29 that face each other at a predetermined space. The right-hand half of the fixed guide plate 28 on the outer side is bent downward, while the movable guide plate 29 on the inner side has a length half of that of the fixed guide plate 28. The movable guide plate 29 is curved so as to face the right-hand half of the fixed guide plate 28. The movable guide plate 29 is also swingably mounted on the frame 20 in a manner such that the space between the two guide plates 28 and 29 is wider on the upper end side. A pair of conveyor belts 30a and 30b are provided on the lower end or outlet side of the guide plates 28 and 29. Each of the conveyor belts 30a and 30b is formed on an endless belt which extends between its corresponding guide plate 28 and 29 on the upper end side and the space over the film recovery magazine 23 on the lower end side. The two conveyor belts 30a and 30b are substantially wholly in contact on one side so that the exposed films fed between the guide plates 28 and 29 are guided in a sandwiched manner to the space over the magazine 23. A pair of delivery pinch rollers 31a and 31b are provided near the lower end or outlet side of the conveyor belts 30a and 30b. A rockable feed plate 32 is disposed on the outlet side of the pinch rollers 31a and 31b, declining toward the magazine 23. The exposed film transferred by the conveyor belts 30a and 30b is fed under the feed plate 32 by the pinch rollers 31a and 31b, and is knocked into the magazine 23 by the feed plate 32 as the feed plate 32 rocks.

In FIG. 3, numeral 33 designates a name printer for printing the name and other data of a subject on film held in the holder 26, while numeral 34 denotes a suction pump connected to the suction means 24 by means of a flexible hose (not shown) and adapted to evacuate the suction means 24. Both these members 33 and 34 are conventional members.

Figure 4A:
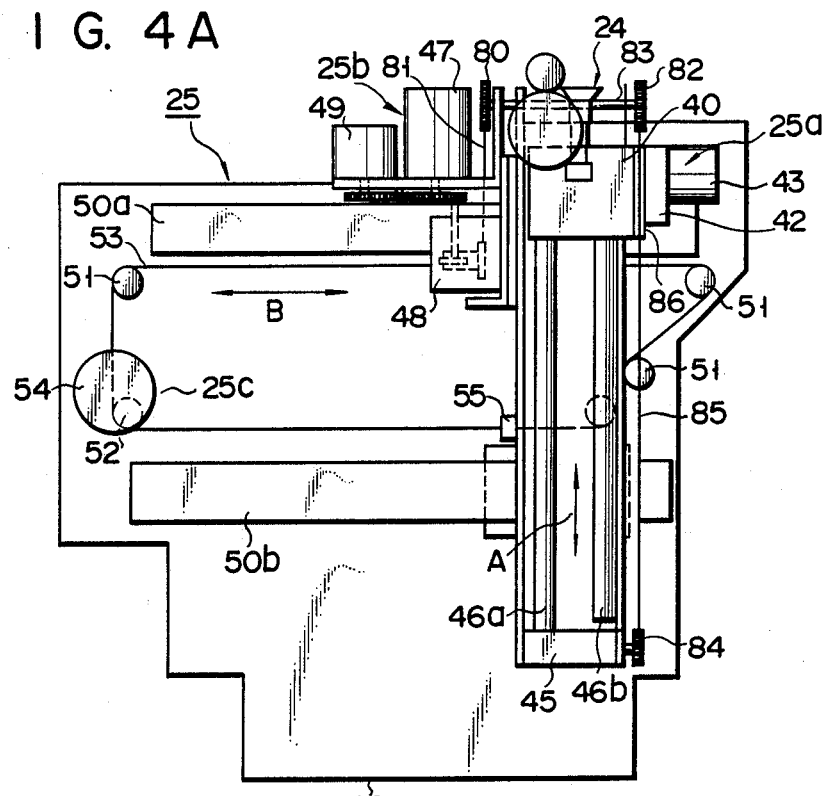
FIGS. 4A and 4B are a front view and a side view, respectively, of a drive mechanism used in the film feeder.
Figure 4B:
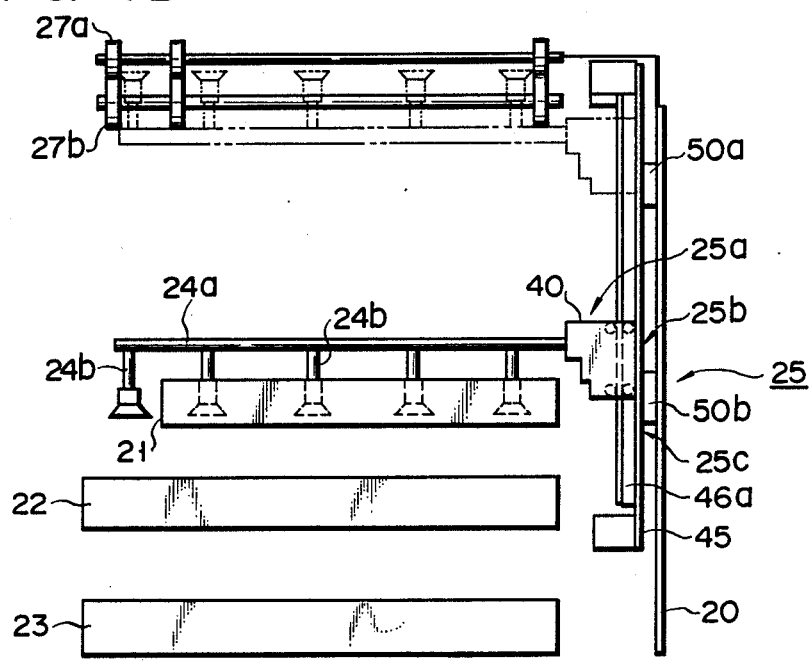

As shown in FIG. 4B, the suction means 24 is formed of a suction cylinder 24a extending along the width of the magazines 21, 22 and 23 and a plurality of funnel-shaped suction cups 24b (five cups in the present embodiment) that are arranged at regular intervals along the suction cylinder 24a and each connected at the basal end to the suction cylinder 24a.

Referring now to FIGS. 4A and 4B, the drive mechanism 25 will be described in detail.

The drive mechanism 25 comprises a rocking mechanism 25a for rocking the suction means 24, a first rectilinear drive mechanism 25b for rectilinearly moving the suction means 24 in a first direction (vertical direction or Y-direction) in association with the rocking mechanism 25a, and a second rectilinear drive mechanism 25c for rectilinearly moving the suction means 24 in a second direction (horizontal direction of X-direction) perpendicular to the first direction in association with the mechanisms 25a and 25b.

The rocking mechanism 25a formed of a suction cylinder holder 40 horizontally supporting one end of the suction cylinder 24a in a manner such that; the suction cylinder 24a; a rotating motor 43 attached to the holder 40; and a gear mechanism 42 disposed between the motor 43 and the suction cylinder 24a which is adapted to transmit rotary power from the motor 43 to the suction cylinder 24a can rotate around the axis of the suction cylinder 24A.

The first rectilinear drive mechanism 25b includes a pair of guide rods 46a and 46b attached to a traversing holder 45 so as to vertically extend parallel to each other. The guide rods 46a and 46b are loosely inserted in through holes that vertically penetrate the suction cylinder holder 40. Thus, the holder 40 is attached to the traversing holder 45 so that it can move vertically along the guide rods 46a and 46b. The traversing holder 45 is provided with a vertical drive motor 47, a rotary encoder 49 for transverse motion control, and a reduction gear mechanism 48. These three members 47, 49 and 48 can all move together. The encoder 49 produces a prescribed signal in response to the rotation of the drive shaft of the motor 47. The shaft of the motor 47 is connected to the reduction gear mechanism 48. A first endless chain 81 is stretched between a sprocket included in the gear mechanism 48 and a sprocket 80 rotatably attached to the upper portion of the traversing holder 45. The sprocket 80 is also connected by means of a shaft 83 with another sprocket 82 which can rotate coaxially therewith. A sprocket 84 is rotatably attached to the lower portion of the traversing holder 45. A second endless chain 85 is stretched between the sprockets 82 and 84, extending vertically. The suction cylinder holder 40 is connected to part of the second chain 85 by means of a coupling member 86. Thus, the holder 40 is moved in the vertical direction indicated by an arrow A by means of the gear mechanism 48 and the first and second endless chains 81 and 85 as the motor 47 rotates.

The second rectilinear drive mechanism 25c includes a pair of guide rails 50a and 50b that extend horizontally at a predetermined space. The traversing holder 45 engages the rails 50a and 50b to be guided thereby in horizontal movement relative to the frame 20. A plurality of idle sprockets 51, which are arranged at predetermined intervals in a loop, are rotatably set between the rails 50a and 50b in the frame 20. An endless chain 53 is passed around the sprockets 51. The chain 53 engages a drive sprocket 52 which is rotatably supported on the frame 20. The drive sprocket 52 is coupled with the shaft of a step motor 54 for transverse drive which is fixed on the frame 20. The holder 45 is coupled to part of the endless chain 53 by a coupling member 55. Thus, the holder 45 is moved horizontally as the chain 53 is driven by the motor 54.

It will be understood from the above description that the drive mechanism 25 can move the suction means 24 in the X-, Y- and θ-directions within a plane (drawing plane of FIG. 3) by means of the motors 43, 47 and 54 thereof.

There will now be described a drive control means 56 which controls the motors 43, 47 and 54 of the drive mechanism 25, thereby guiding the suction means 24 along a predetermined course.

The drive control means 56 is provided in the frame 20 as shown in FIG. 3, and, in a predetermined embodiment, controls the motion of the suction means 24 in the following manner.

In feeding unexposed film taken out from the first film supply magazine 21, the suction means 24 moves linearly via spots a3, a2, a1, b1, c, d and e in FIG. 3 in the order named. The suction means 24 oscillates through an angle f1 around its basal part (suction cylinder 24a) at the spot a2, rocks counterclockwise through an angle f3 at the spot c, and rocks counterclockwise through an angle f3 at the spot c, and rocks counterclockwise through an angle f4 at the spot d. The suction means 24 oscillates at the spot a2 in order to separate the uppermost film in the magazine attracted to the downward suction cups 24b from the next film which may stick to the uppermost one, that is, to prevent the removal of any superposed film. Under the condition that f3+f4=180° (f3=60° and f4=120° in the present embodiment), the suction means 24 swings through the angles f3 and f4 in order that the suction cups 24b turn upward to feed the film between the feed rollers 27a and 27b. To feed more film from the first magazine 21 by a suction means 24 that has finished feeding the preceding film between the feed rollers 27a and 27b, the suction means 24 is brought close to the magazine 21 through a return path reverse to the forward path. Preferably, the suction means 24 is designed so that it passes through the spot a2 without oscillating in the return path.

In feeding unexposed film taken out from the second film supply magazine 22, the suction means 24 moves linearly via spots b3, b2, b1, c, d and e in FIG. 3. The suction means 42 or the suction cups 24b oscillate through an angle f2 at the spot b2 for the prevention of the take-out of superposed films. Then, the suction means 42 rocks counterclockwise through the angles f3 and f4 at the spots c and d, respectively, in the same manner as in the feeding of the film from the first magazine 21.

A first transfer path R1 covering the spots a3, a2, a1, b1, c, d and e, and a second transfer path R2 covering the spots b3, b2, b1, c, d and e meet at the point b1 and overlap at the section covering the spots c, d and e. For convenience, the spot b1 will hereafter be referred to as the initial position of the suction means 24. The suction means 24 can reach the first or second magazine 21 or 22 more conveniently if it is previously located in the initial position. To attain this, it is desirable that one operation cycle start when unexposed film is fed to the holder 26 by the suction means 24, and that it end when the suction means 24 returns to the initial position b1.

Figure 5:
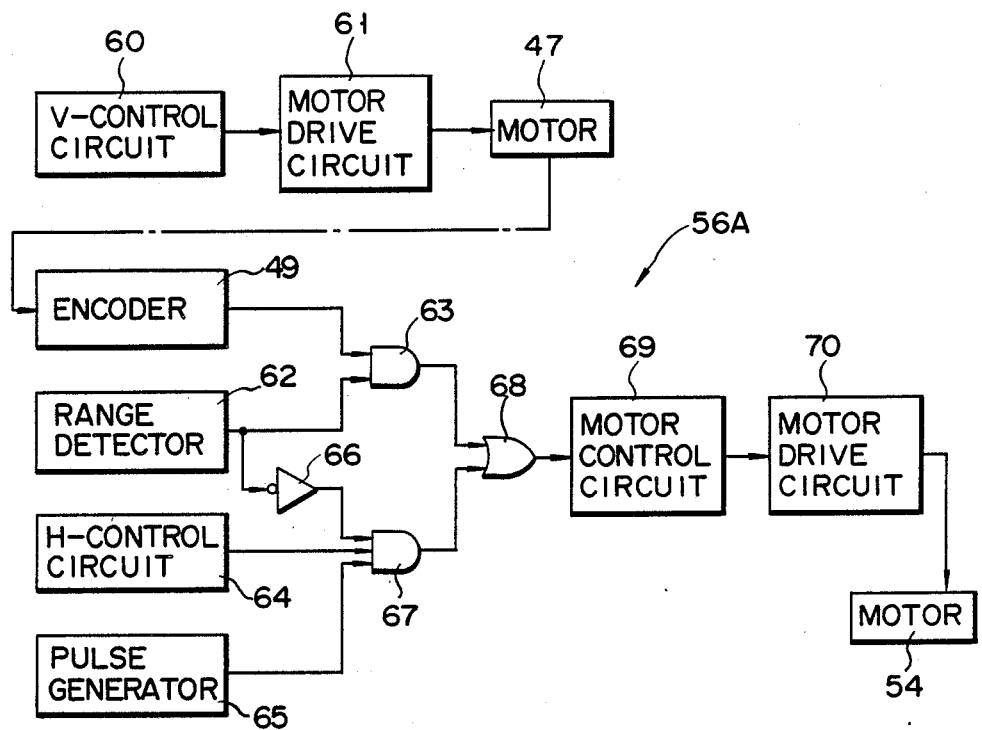
FIG. 5 is a block circuit diagram showing a synchronous control means of the drive mechanism.

In the transfer paths R1 and R2, the suction means 24 may moved to the spot c from the spot d to take a minimum moving distance, since the section between these spots c and d is inclined in the direction to synchronize the movements of the suction means 24 in the X- and Y-directions. Referring now to FIG. 5, there will be described an example of a synchronous control means 56a for such synchronization.

The synchronous control means 56a includes a vertical drive control circuit 60 and a vertical drive motor drive circuit 61 to receive a control circuit from the control circuit 60. The vertical drive motor 47 is triggered by a drive signal from the drive circuit 61. The output of the encoder 49, which is coupled to the output shaft of the motor 47 to drive the gear mechanism 48, is connected to one input of a first AND gate 63. The other input of the first AND gate 63 is connected with the output of a synchronous control range detector 62 which is formed of a photosensor, microswitch or other means for detecting the situation that the suction means 24 is on the section between the spots c and d of FIG. 3, that is, on the slant path section. The output of the detector 62 is also connected to a first input terminal of a second AND gate 67 through an inverter 66. Second and third input terminals of the second AND gate 67 are connected to the outputs of a transverse drive control circuit 64 and a pulse generator 65, respectively. The respective outputs of the first and second AND gates 63 and 67 are connected to the input of an OR gate 68. The output of the OR gate 68 is connected to the step member 54 through a step motor drive control circuit 69 and a step motor drive circuit 70.

The operation of the film feeder of the X-ray photographic apparatus with the aforementioned construction will now be described.

If the removal of unexposed film from the first film supply magazine 21 is selected by operating a selector switch (not shown) on the frame 20, the suction means 24 attracts the unexposed film by means of the suction cups 24b, and then moves up to the spot a2 by the agency of the drive mechanism 25 and drive control means 56. The suction means 24 oscillates through the angle f1 at the spot a2 to prevent the removal of any superposed film, and then moves up to the spot a1. Thereafter, it moves to the right to reach the spot c via the spot b1. At the spot c, it rocks counterclockwise through the angle f3 (60°). Then, it moves diagonally (at 60°) upward from the spot c to the spot d, where is rocks counterclockwise through the angle f4 (120°). Thus, the suction means 24 is positioned so that the suction cups 24 are turned upward to bear the film thereon. In this position, the suction means 24 moves to the left to reach the spot e. At the spot e, the unexposed film carried in this manner is fed into the holder 26 by the pair of feed rollers 27a and 27b. Thereafter, the holder 26 moves to the left to subject the film to X-ray photographing.

If the removal of any unexposed film from the second film supply magazine 22 is selected by switch operation, the suction means 24 attracts the film, and then moves up to the spot b1 via the spots b3 and b2 by the agency of the drive mechanism 25 and the drive control means 56. At the spot b2, the suction means 24 oscillates through the angle f2 to prevent the removal of any superposed films. Thereafter, the suction means 24 reaches the spot e via the spots c and d, as in feeding the film from the first magazine 21. At the spot e, film is fed into the holder 26.

In the film feed according to the present embodiment, as described above, unexposed film can selectively be taken out from the two film supply magazines 21 and 22 by the use of a single drive mechanism 25 and a single suction means 24. Therefore, the apparatus of the invention can be made smaller and simpler than the prior art apparatus which requires a plurality of drive mechanisms and a plurality of suction means. Since unexposed film is fed from the magazines to the holder by only a suction means, it is possible to avoid damage to the film attributed to sliding contact between the film and the conveyor guides that are used in the prior art apparatus.

Referring now to FIGS. 6A to 6G, the operation for the movements of the suction means 24 in the X-, Y- and θ-directions will be described in detail.

The pulse generator 65 (FIG. 5) supplies a predetermined pulse signal as shown in FIG. 6D to the second AND gates 67. A drive control signal is delivered from the vertical drive control circuit 60. Receiving this drive control signal, the vertical drive motor drive circuit 61 delivers an output signal whereby the vertical drive motor 47 is driven. As a result, the suction means 24 is moved vertically (upward). The drive of the motor 47 in this manner continues until the time t1 when the suction means 24 reaches the spot a1. When the motor 47 is stopped at time t1, that is, when the input signal to the motor 47 becomes low, the output of the encoder 49 also becomes low, as shown in FIG. 6A. Even after time t1, the output of the detector 62 remains at a low level (L-level) to indicate that the spot c has not been reached by the suction means 24, as shown in FIG. 6B, so that the output of the encoder 49 and the output signal of the first AND gate 63 operate the AND of the detector 62 the output of which maintains a low level. The output signal of the second AND gate 67 to which is applied: the inverted output signal (FIG. 6B) of the synchronous control range detector 62; the output signal (FIG. 6C) of the transverse drive control circuit 64; and the pulse signal (FIG. 6D) from the pulse generator 65, is a pulse signal during the interval between times t1 and t2, as shown in FIG. 6F. Therefore, the output signal of the OR gate 68 to which is applied the output signals of the AND gates 63 and 67 is a pulse signal, as shown in FIG. 6G. Accordingly, the motor 54 is triggered by the pulse signal through the medium of the control circuit 69 and the drive circuit 70. Thus, the suction means 24 moves horizontally (to the right) while it is transferred from the spot a1 to the spot c by the motor 54.

When the suction means 24 reaches the spot c, the detector 62 detects this, and its output (FIG. 6B) is inverted. In a short period of time (between times t2 and t3), the output of the encoder 49 is inverted to the low level, and becomes a pulse signal. As a result, the output of the first AND gte 63 becomes a pulse signal, so that the output of the OR gate 68 also becomes a pulse signal responsive to the output of the OR gate 68 and the motor 54 is started. Since the two motors 47 and 54 are driven synchronously after time t3, the suction means 24 is moved diagonally to the upper right to reach the spot d.

During the time interval between times t2 and t3 when the motors 47 and 54 are stopped, the suction means 24 is rocked counterclockwise through the angle f3. Control means for the motor 43 to achieve such rocking is expected to drive the motor 43 for a time corresponding to the angle f3 after detecting that the spot c is reached by the suction means 24.

Description of the control of the suction means 24 after the spot d is reached thereby is omitted here, since it may be inferred from the foregoing description.

If a rotation transmission system for the rotary encoder 49 for transverse motion control is constructed so that the encoder 49 delivers one pulse every time the suction means 24 moves vertically for, e.g., 1 mm, and if the second rectilinear drive mechanism 25c is constructed so that the suction means 24 moves transversely for 1 mm every time the transverse drive step motor 54 rotates for one step angle, then the slant path section between the spots c and d of FIG. 3 is inclined horizontally at 45°. The inclination of the slant path section can optionally be set by changing the rate of rotation transmission to the rotary encoder 49. In moving the suction means 24 diagonally, the first and second rectilinear drive mechanisms 25b and 25c are controlled synchronously. Therefore, if the rotating speed of the vertical drive motor 47 is changed by load fluctuations, the rotation of the rotary encoder 49 for transverse motion control synchronizes with the change. Thus, the rotating speed of the transverse drive step motor 54 follows the change to stabilize the slant path section.

In the apparatus of the present embodiment, as seen from the above description, the use of the drive mechanism 25 and the drive control means 56 permits removal of unexposed film from a plurality of film supply magazines by the use of a single suction means, thus reducing the size of the apparatus. Since the first and second rectilinear drive mechanisms can be controlled synchronously in the diagonal transfer of the suction means, a fixed transfer path may be maintained for the shortest course without an interference. The use of different transfer paths for exposed and unexposed film permits shortening of the shot cycle. Moreover, the exposed film is fed between conveyor belts substantially throughout the course. If any film is jammed, therefore, it can be removed with ease.

Although an illustrative embodiment of the present invention has been described in detail herein, it is to be understood that the invention is not limited to this embodiment, and that various changes and modifications may be effected therein by one skilled in the art without departing from the scope or spirit of the invention. For example, the drive control means for controlling the displacement of the suction means by the drive mechanism to transfer the unexpected film in the film supply magazine to the feed mechanism is not limited to the one used in the above embodiment. It may alternatively be constructed so that the drive amount of the drive mechanism is controlled in accordance with a pulse signal delivered in response to the drive amount of the feed mechanism, and that the drive mechanism and the feed mechanism are controlled synchronously in delivering unexposed film from the drive mechanism to the feed mechanism. Specifically, a rotary encoder (not shown) for feeding is mounted on the drive shaft of a drive source (not shown) for the feed rollers 27a and 27b shown in FIG. 3. In moving the suction means 24 between the spots d and e, the step motor 54 for transverse drive is driven in accordance with output pulses from the rotary encoder by a system similar to the synchronous control means shown in FIG. 5. With this arrangement, the transfer of the film by the suction means and the film transfer by the feed rollers can be synchronized, so that the speeds of film transfer by these individual means can be made equal to securely prevent excessive stress from acting on the film at the time of delivery thereof.

In the aforementioned embodiment, although two magazines for loading unexposed film therein are used, more than two magazines may be used. In this case, more than two sizes of film may be used without changing of magazines.

What is claimed is:

1. A film feeder of a cassetteless x-ray photographic apparatus, comprising:
    a frame;
    at least first and second magazines for respectively storing a plurality of unexposed films of first and second sizes;
    a recovery magazine for storing exposed films;
    a holder movable between first and second positions for holding an unexposed film therein, the holder having an end for insertion of the unexposed film into the holder when the holder is in the first position, the exposed film in the holder being positioned for exposure with the holder in the second position, and after exposure the film being supported for discharge from the holder at said end thereof with the holder in the first position;
    a common suction means of picking up and holding one of the unexposed films stored in the first and second magazines;
    a first guide path extending to said first position from the first and second magazines;
    film return guide path extending to the recovery magazine from said first position, the second guide path being different from the first guide path;
    a driving means for moving the suction holding the unexposed film in vertical and horizontal directions, rotating the suction means, and moving the suction means to said first position of said holder along the first guide path; and
    a return mechanism for transporting the exposed film along said film return guide path to the recovery magazine from said first position.

2. The film feeder according to claim 1, wherein said first guide path terminates at a common guide path section extending to the feed mechanism, which section is common to said first guide path and to a second guide path from one of the first and second magazines.

3. The film feeder according to claim 2, wherein said common guide path section includes a slant guide path section.

4. The film feeder according to claim 3, wherein said common guide path section includes part of the second guide path.

5. The film feeder according to claim 4, wherein said common suction means includes at least one suction cup for attracting the unexposed film on the back thereof, and a drive control mechanism including a rotating mechanism for rocking the common suction means in one direction through a fixed angle within 180° at an intersection of the horizontal guide path section and one end of the slant guide path section, and to rotate the common suction means in said one direction through an angle equal to 180° minus said fixed angle at another end of the slant guide path section.

6. The film feeder according to claim 5, wherein said driving means includes first and second motors for moving the common suction means, and said drive control mechanism includes means for producing a pulse signal responsive to the drive of the first motor and means for controlling the drive of the second motor in accordance with the pulse signal.

7. The film feeder according to claim 1, wherein said return mechanism includes a pair of endless belts for holding and carrying an exposed film from said holder.

8. The film feeder according to claim 2 wherein said first and second magazines are substantially horizontally positioned one above the other with one of said first and second guide paths extending from said first magazine and another thereof extending from said second magazines.

9. The film feeder according to claim 1, which further includes a feed mechanism located in the position near the holder for feeding the unexposed film to the holder from the common suction means, and the exposed film to the return feed mechanism from the holder.

10. The film feede according to claim 9, wherein said feed mechanism includes a pair of pinch rollers which rotate in one direction to directly feed the unexposed film to the holder from the common suction means, and rotate in another direction to directly feed the exposed film to the return feed mechanism from the holder.

* * * * *

UNITED STATES PATENT AND TRADEMARK OFFICE
CERTIFICATE OF CORRECTION

PATENT NO. : 4,920,553
DATED : April 24, 1990
INVENTOR(S) : Sasaki et al.

It is certified that error appears in the above-identified patent and that said Letters Patent is hereby corrected as shown below:

In the Claims

Claim 1, Column 8, Line 43, change "exposed" to --unexposed--;

Claim 10, Column 10, Line 17, change "feede" to --feeder--.

Signed and Sealed this

Second Day of June, 1992

Attest:

DOUGLAS B. COMER

Attesting Officer

Acting Commissioner of Patents and Trademarks